United States Patent
Horiike

(10) Patent No.: US 6,798,987 B2
(45) Date of Patent: Sep. 28, 2004

(54) DRIVING APPARATUS, LIGHT-AMOUNT REGULATING APPARATUS, AND LENS DRIVING APPARATUS

(75) Inventor: Kaori Horiike, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/625,077

(22) Filed: Jul. 22, 2003

(65) Prior Publication Data

US 2004/0126106 A1 Jul. 1, 2004

(30) Foreign Application Priority Data

Jul. 29, 2002 (JP) ........................................ 2002-219361
Jun. 30, 2003 (JP) ........................................ 2003-186277

(51) Int. Cl.$^7$ .............................................. G03B 17/00
(52) U.S. Cl. ..................... 396/75; 396/133; 396/463; 396/508; 310/15; 310/265; 310/268
(58) Field of Search .......................... 396/75, 133, 463, 396/508; 310/15, 265, 268; 318/119, 126, 127

(56) References Cited

U.S. PATENT DOCUMENTS 6,719,463 B2 * 4/2004 Aoshima .................... 396/463

FOREIGN PATENT DOCUMENTS

| JP | 2001-075146 | 3/2001 | ............ G03B/9/10 |
| JP | 2002-049076 | 2/2002 | ............ G03B/9/02 |

* cited by examiner

Primary Examiner—W. B. Perkey
(74) Attorney, Agent, or Firm—Cowan, Liebowitz & Latman

(57) ABSTRACT

A driving apparatus includes a rotor rotatable about a rotational axis and having a cylindrical magnet portion whose outer circumferential surface are divided along a circumferential direction into a plurality of differently magnetized portions, at least an outer magnetic pole portion formed extending in a direction parallel to the rotational axis of the rotor, and facing the outer circumferential surface of the magnet portion, an inner magnetic pole portion formed opposingly to the outer magnetic pole portion, and facing an inner circumferential surface of the magnet portion, and a coil for magnetically exciting the outer and inner magnetic pole portions. The coil is arranged along a direction of the rotational axis of the rotor. The rotor can be selectively held at one of three stop positions, and a condition of $-0.3X+0.72<Y$ is satisfied where Y is a ratio of a central angle of each outer magnetic pole portion relative to a central angle of each magnetized pole in the magnet portion, and X is a ratio of a circumferential length of each magnetized pole in the magnet portion relative to a thickness of the magnet portion in its radial direction.

9 Claims, 12 Drawing Sheets

FIG. 11

|   | STATOR MAX DIAMETER | MAGNET OUTSIDE DIAMETER | NUMBER OF MAGNETIC POLES | MAGNET THICKNESS |
|---|---|---|---|---|
| 1 | φ6 | 4.8mm | 10 | 0.5mm |
| 2 | φ10.9 | 10mm | 20 | 0.5mm |
| 3 | φ11.5 | 10.6mm | 20 | 0.5mm |
| 4 | φ11.9 | 11mm | 20 | 0.6mm |
| 5 | φ11.9 | 11mm | 20 | 0.5mm |
| 6 | φ11.9 | 11mm | 20 | 0.3mm |
| 7 | φ11.9 | 11mm | 12 | 0.5mm |
| 8 | φ11.9 | 11mm | 24 | 0.5mm |
| 9 | φ12.9 | 12mm | 20 | 0.5mm |

DRIVING APPARATUS, LIGHT-AMOUNT REGULATING APPARATUS, AND LENS DRIVING APPARATUS

BACKGROUND OF THE INVENTION

1. Field of the Invention

The present invention relates to improvements of a driving apparatus and a light-amount regulating apparatus which are suitably usable in a shutter device and the like provided in an image pick-up apparatus such as a digital camera. The present invention also relates to an improvement of a lens driving apparatus suitably usable in a lens driving mechanism provided in the image pick-up apparatus.

2. Related Background Art

A conventional shutter device of a lens shutter camera as illustrated in FIG. 17 has been proposed. In FIG. 17, reference numeral 101 designates a magnet member of a permanent magnet. Reference numeral 102 designates a driving lever. Reference numeral 102a designates a driving pin formed on the driving lever 102. The driving lever 102 is fixed to the magnet 101, and rotated together with the magnet 101. Reference numeral 103 designates a coil. Reference numerals 104 and 105 designate stators made of soft magnetic material, and magnetically excited by the coil 103, respectively. The stators 104 and 105 are connected to each other by portions 104a and 105a, and integrally arranged in a common magnetic circuit. Upon supplying current to the coil 103, the stators 104 and 105 are magnetically excited, and the magnet 101 is rotationally driven in a range of a predetermined angle.

Reference numerals 106 and 107 designate shutter blades, respectively. Reference numeral 108 designates a plate. Hole portions 106a and 107a of the shutter blades 106 and 107 are rotatably mounted on pins 108b and 108c of the plate 108, respectively. The driving pin 102a is slidably fitted into elongate holes 106b and 107b. Accordingly, when the driving lever 102 rotates with the magnet 101, the shutter blades 106 and 107 are rotationally driven about the holes 106a and 107a, respectively. An aperture portion 108a of the plate 108 is hence opened or closed. For purposes of preventing an increase in the cost, there has also been proposed a structure in which the magnet is comprised of a plastic magnet, and the driving pin is formed integrally with the magnet.

Reference numeral 109 designates a front plate for movably holding the shutter blades 106 and 107 between this front plate and the plate 108. Reference numeral 110 designates a rear plate for holding the stators 104 and 105, and rotatably holding the magnet 101.

Digital cameras for opto-electrically converting a field image and recording it as information of a still picture image in a recording medium by using a CCD and the like as a pick-up device have been more and more widely used. An example of the operation of exposure in those digital cameras will be discussed in the following.

The main power source is initially switched on prior to photographing to put the pick-up device in its operating condition, and the shutter blade is hence held at its open position capable of exposing the pick-up device. Accordingly, storing, discharging and transferring of electric charges are repeated by the pick-up device, and observation of the object field is made possible through the image monitor.

Thereafter, upon pushing the release button, stop value and exposure time are determined corresponding to the output of the pick-up device at that time. Accordingly, when the diameter of the exposure aperture needs to be narrowed, the stop blade is driven to be set at a predetermined stop value. Instruction of start of storing electric charges is then sent to the pick-up device from which stored electric charges are discharged. At the same time the circuit for controlling the exposure time begins to operate upon reception of that start instruction as a trigger signal.

After the lapse of a predetermined exposure time, the shutter blade is driven to its closed position for intercepting the exposure of the pick-up device. Upon intercepting the exposure of the pick-up device, the stored electric charges begin to be transferred. The picture image information is thus recorded in the recording medium through an image writing apparatus. Exposure of the pick-up device is blocked during the transfer of electric charges to prevent variation of electric charges due to undesired light during this transfer time.

Other than the above-discussed shutter apparatus, there also exist an apparatus with a mechanism for advancing or retracting an ND filter, and an apparatus with a mechanism for advancing or retracting a stop restricting member having a small stop diameter.

In the above shutter apparatus, the thickness can be decreased, but the coil and the stators are liable to occupy a wide area on the plate. In view of such disadvantage, a light-amount regulating apparatus as illustrated in FIG. 18 has been proposed.

In FIG. 18, reference numeral 201 designates a cylindrical rotor 201 whose portions 201a and 201b are magnetized to N and S magnetic poles, respectively. Reference numeral 201c designates an arm formed integrally with the rotor 201. A driving pin 201d extends from the arm 201c in the rotational axial direction of the rotor 201. Reference numeral 202 designates a coil disposed along the axial direction of the rotor 201. Reference numeral 203 designates a stator which is formed of soft magnetic material, and magnetically excited by the coil 202. The stator 203 has an outer magnetic pole portion 203a which faces the outer surface of the rotor 201, and an inner cylinder which is inserted into the rotor 201.

Reference numeral 204 designates an auxiliary stator which is fixed to the inner cylinder of the stator 203, and faces the inner surface of the rotor 201. Upon supplying electric power to the coil 202, the outer magnetic pole portion 203a and the auxiliary stator 204 are magnetically excited, and the rotor 201 is rotated up to a predetermined position. Reference numerals 207 and 208 designate shutter blades, and reference numeral 205 designates a plate. The shutter blades 207 and 208 are respectively rotatable about hole portions 207a and 208a into which pins 205b and 205c of the plate 205 are inserted, respectively. The driving pin 201d slidably engages with elongate holes 207b and 208b. Reference numeral 206 designates a torsion spring which gives elastic force to the rotor 201 such that the driving pin 201d can be pushed against ends of the elongate 207b and 208b. When electric power is supplied to the coil 202 to rotate the driving pin 201d together with the rotor 201 against the elastic force of the torsion spring 206, the shutter blades 207 and 208 are rotated about the hole portions 207a and 208a, respectively. The aperture portion 205a of the plate 205 is hence opened or closed.

A compact light-amount controlling apparatus can be achieved by such a light-amount regulating apparatus.

The light-amount regulating apparatus of FIG. 18 is more suitable for a small-sized structure than that of FIG. 17. In the light-amount regulating apparatus of FIG. 18, however, the shutter blades 207 and 208 can be simply held at either of their open positions or closed positions by changing the current supply condition of the coil only between ON state and OFF state. In other words, those light-amount regulating blades can be driven only between two states, i.e., a state in which the aperture portion is covered with them, and a state in which they are retracted from the aperture portion. Therefore, it is desired to provide an apparatus in which an intermediate open state between the above two states, for example, can also be established.

SUMMARY OF THE INVENTION

According to one aspect of the present invention, there is provided a driving apparatus which includes a rotor rotatable about its rotational axis and having a cyclindrical magnet portion whose outer circumferential surfaces are divided along a circumferential direction into plural differently magnetized portions; at least an outer magnetic pole portion formed extending in a direction parallel to the rotational axis of the rotor, and facing the outer circumferential surface of the magnet portion; an inner magnetic pole portion, and facing an inner circumferential surface of the magnet portion; and a coil for magnetically exciting the outer and inner magnetic pole portions, which is arranged along a direction of the rotational axis of the rotor.

In this driving apparatus, the rotor can be selectively held at one of three stop position, and a condition of $-0.3X+0.72<Y$ is satisfied where Y is a ratio of a central angle of each outer magnetic pole portion relative to a central angle of each magnetized pole in the magnet portion, and X is a ratio of a circumferential length of each magnetized pole in the magnet portion relative to a thickness of the magnet portion in its radial direction.

According to another aspect of the present invention, there is provided a driving apparatus which includes a rotor rotatable about its rotational axis and having a cylindrical magnet portion whose outer circumferential surfaces are divided along a circumferential direction into plural differently magnetized portions; an output member operative in response to rotation of the rotor; at least an outer magnetic pole portion formed extending in a direction parallel to the rotational axis of the rotor, and facing the outer circumferential surface of the magnet portion; an inner magnetic pole portion formed opposingly to the outer magnetic pole portion, and facing an inner circumferential surface of the magnet portion; a coil for magnetically exciting the outer and inner magnetic pole portions, which is arranged along a direction of the rotational axis of the rotor; a plate having an aperture portion; and a light-amount regulating member for changing the amount of light passing through the aperture portion upon being driven by the output member to advance toward or retract from the aperture portion of the plate.

In this driving apparatus, the light-amount regulating member can be selectively held at one of three stop positions, and a condition of $-0.3X+0.72 <Y$ is satisfied where Y is a ratio of a central angle of each outer magnetic pole portion relative to a central angle of each magnetized pole in the magnet portion, and X is a ratio of a circumferential length of each magnetized pole in the magnet portion relative to a thickness of the magnet portion in its radial direction.

According to still another aspect of the present invention, there is provided a driving apparatus which includes a rotor rotatable about its rotational axis and having a cylindrical magnet portion whose outer circumferential surfaces are divided along a circumferential direction into plural differently magnetized portions; an output member operative in response to rotation of the rotor; at least an outer magnetic pole portion formed extending in a direction parallel to the rotational axis of the rotor, and facing the outer circumferential surface of the magnet portion; an inner magnetic pole portion formed opposingly to the outer magnetic pole portion, and facing an inner circumferential surface of the magnet portion; a coil for magnetically exciting the outer and inner magnetic pole portions, which is arranged along a direction of the rotational axis of the rotor; a plate having an aperture portion; and a lens for changing a focal length of a light beam passing through the aperture portion upon being driven by the output member to advance toward or retract from the aperture portion of the plate.

In this driving apparatus, the lens can be selectively held at one of three stop positions, and a condition of $-0.3X+0.72<Y$ is satisfied where Y is a ratio of a central angle of each outer magnetic pole portion relative to a central angle of each magnetized pole in the magnet portion, and X is a ratio of a circumferential length of each magnetized pole in the magnet portion relative to a thickness of the magnet portion in its radial direction.

According to those structures, there can be provided a simple driving apparatus in which the rotor can be held at its rotational position at which a boundary portion between magnetic poles of the magnet portion faces the outer magnetic pole portion, due to cogging torque acting between the magnet portion of the rotor and the stator, when no current is supplied to the coil; the rotor can be selectively rotated in one of different directions by changing the direction of current supplied to the coil; and three stop positions exist.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 11 is a table describing structures of motor models used to obtain relationships of FIG. 10;

DESCRIPTION OF THE PREFERRED EMBODIMENTS

Embodiments of the present invention will hereinafter be described with reference to the drawings.

Figure 1:
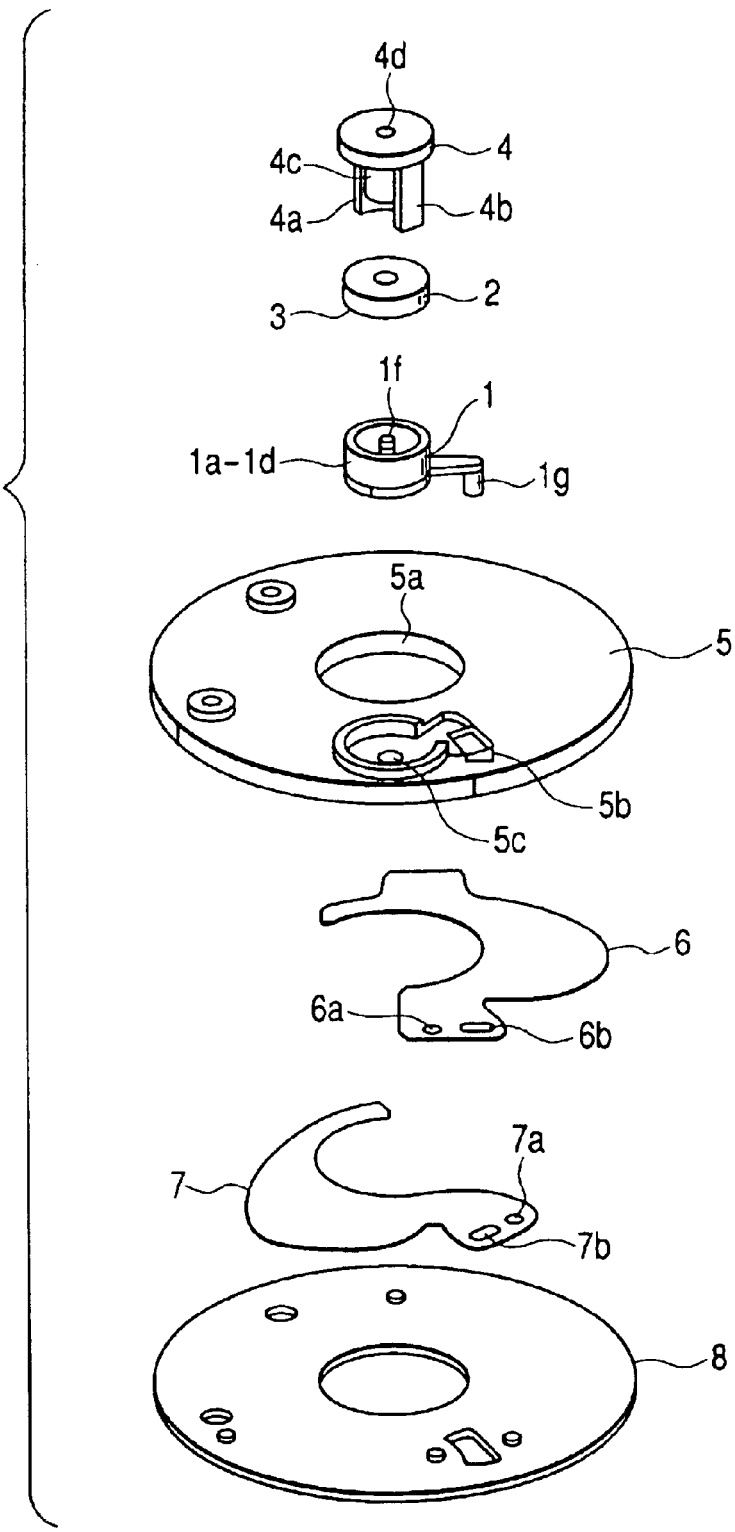
FIG. 1 is a disassembled perspective view illustrating a first embodiment of a light-amount regulating apparatus according to the present invention.
Figure 2:
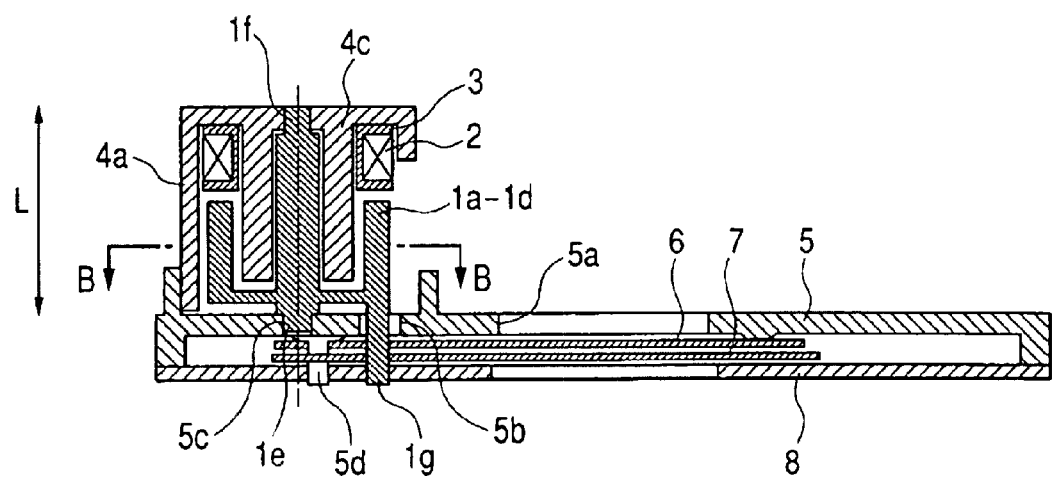
FIG. 2 is a cross-sectional view illustrating the light-amount regulating apparatus of FIG. 1.
Figure 3:
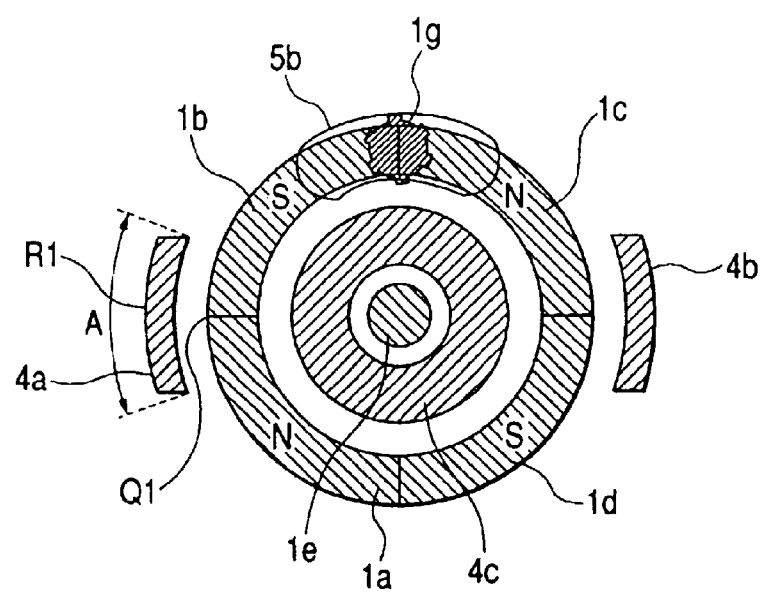
FIG. 3 is a B—B cross-sectional view of FIG. 2 illustrating the state in which the rotor is in a third position.
Figure 4:
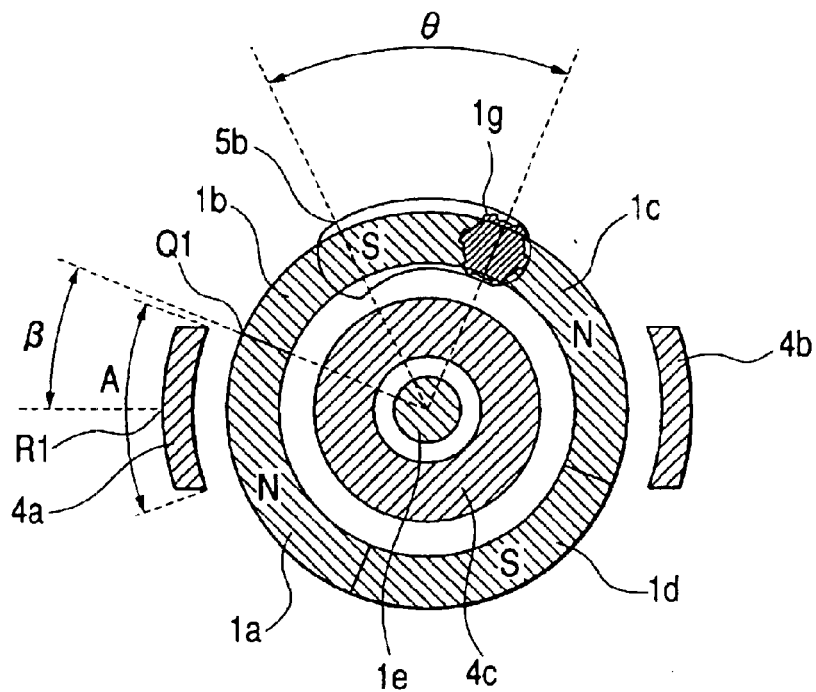
FIG. 4 is a B—B cross-sectional view of FIG. 2 illustrating the state in which the rotor is in a first position.
Figure 5:
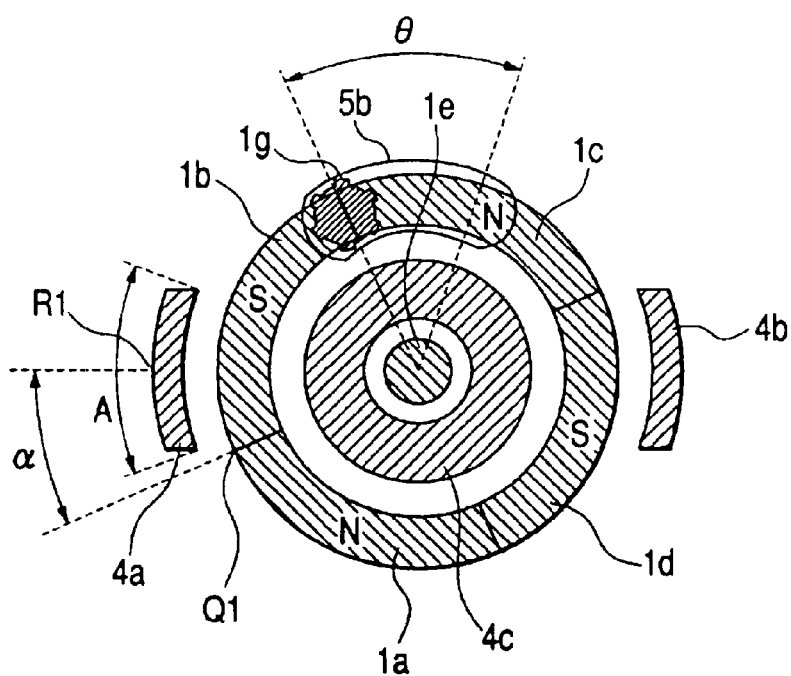
FIG. 5 is a B—B cross-sectional view of FIG. 2 illustrating the state in which the rotor is in a second position.
Figure 6:
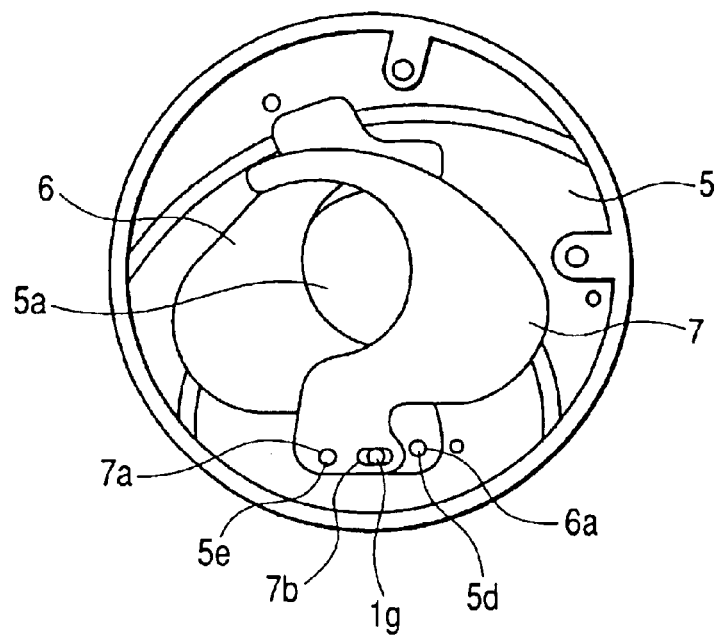
FIG. 6 is a view illustrating the rotational position of the light-amount regulating blade at the time when the rotor of the first embodiment is in a third position.
Figure 7:
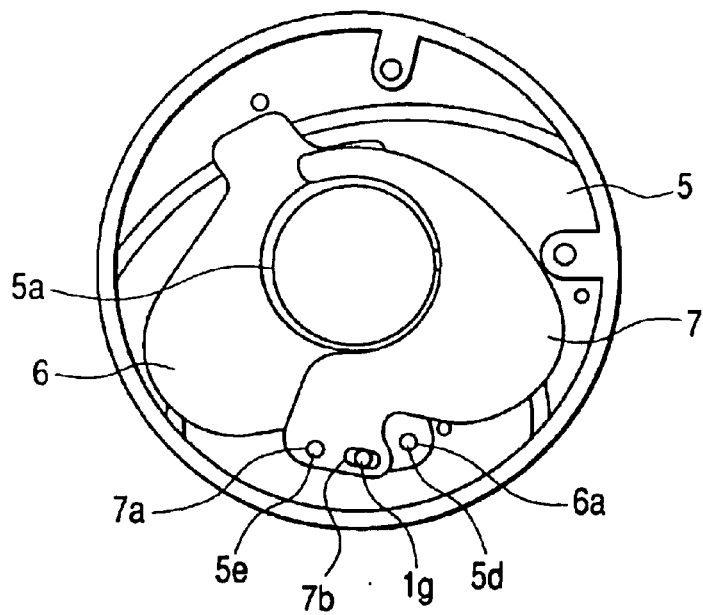
FIG. 7 is a view illustrating the rotational position of the light-amount regulating blade at the time when the rotor of the first embodiment is in a first position.
Figure 8:
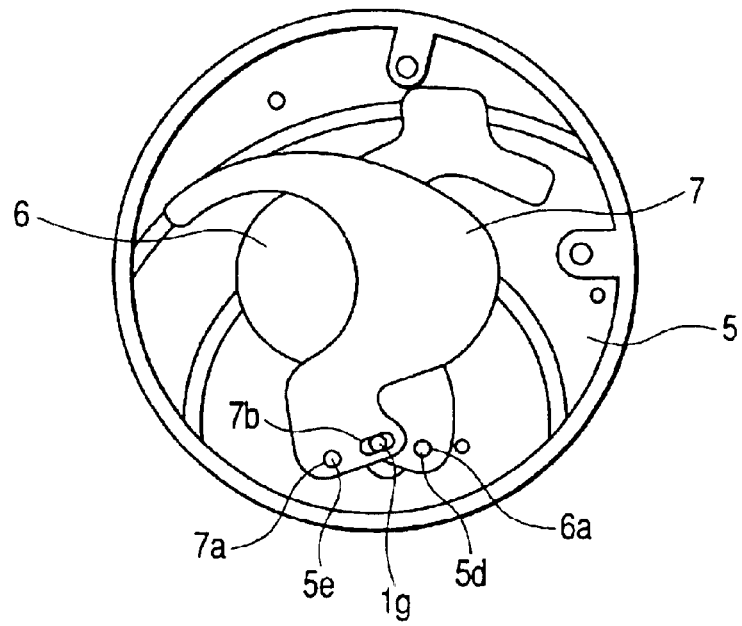
FIG. 8 is a view illustrating the rotational position of the light-amount regulating blade at the time when the rotor of the first embodiment is in a second position.

FIGS. 1 to 8 illustrate a first embodiment of a light-amount regulating apparatus according to the present invention. FIG. 1 is a disassembled perspective view of the light-amount regulating apparatus, and FIG. 2 is a cross-sectional view of FIG. 1. In FIG. 2 showing the driving apparatus, its left half illustrates a cross section of a portion with an outer magnetic pole portion of a stator, while its right half illustrates a cross section of a portion without the outer magnetic pole portion. FIG. 3 is a B—B cross-sectional view of FIG. 2 illustrating the state in which a rotor is in its third position, FIG. 4 is a B—B cross-sectional view of FIG. 2 illustrating the state in which the rotor is in its first position, and FIG. 5 is a B—B cross-sectional view of FIG. 2 illustrating the state in which the rotor is in its second position. FIG. 6 is a view illustrating the rotational position of a light-amount regulating blade at the time when the rotor is in its third position, FIG. 7 is a view illustrating the rotational position of the light-amount regulating blade at the time when the rotor is in its first position, and FIG. 8 is a view illustrating the rotational position of the light-amount regulating blade at the time when the rotor is in its second position. Details of the first, second, and third positions of the rotor will be described later.

In those figures, reference numeral 1 represents a rotor made of plastic magnetic material and having a magnet portion in an approximately cylindrical form. An outer circumferential surface of the magnet portion 1 is divided into four portions in its circumferential direction, and these divided portions are alternately magnetized into N and S magnetic poles. As illustrated in FIG. 3, outer circumferential surfaces of magnetized portions 1a and 1c are magnetized into the N pole, while outer circumferential surfaces of magnetized portions 1b and 1d are magnetized into the S pole. In the first embodiment, the number of magnetized poles is four, but two or more magnetized poles will suffice. A driving pin 1g extending in the axial direction is formed integrally with the magnet portion of the rotor 1. The motion range of the driving pin 1g is restricted by a guide groove 5b of a plate (described later). The driving apparatus of the light-amount regulating apparatus is so arranged that the driving pin 1g can advance toward or retract from a center of an aperture portion 5a of the plate, i.e., the driving pin 1g can move in a radial direction of the plate 5.

Reference numeral 2 represents a cylindrical coil wound on a bobbin 3. The coil 2 is concentric with the rotor 1, and is disposed adjacent to the rotor 1 in the axial direction. The outer diameter of the coil 2 is approximately equal to that of the magnet portion of the rotor 1. One coil 2 is sufficient since the driving apparatus adopts a method of one-phase-on-drive.

Reference numeral 4 designates a stator formed of soft magnetic material. The stator 4 includes an outer cylinder having tooth-shaped outer magnetic pole portions 4a and 4b at its tip portion, and an inner cylinder 4c of a pole-shaped inner magnetic pole portion. The outer magnetic pole portions 4a and 4b are formed so as to face the outer circumferential surface of the rotor 1 with a predetermined space therebetween and over a predetermined angle (see an angle A in FIG. 3). Here, the angle is a central angle of a fan-shaped portion formed by each of the outer magnetic pole portions 4a and 4b and the rotational center of the magnet portion. The predetermined angle in the first embodiment will be described later. The pole-shaped inner cylinder 4c of the stator 4 constitutes the inner magnetic pole portion. The inner cylinder is formed so as to face the inner circumferential surface of the rotor 1 with a predetermined space therebetween. Those rotor 1, coil 2, bobbin 3, and stator 4 constitute the driving apparatus for operating the light-amount regulating apparatus.

Reference numeral 5 represents a plate of the light-amount regulating apparatus. An aperture portion 5a is formed at a central portion of the plate 5. Blade members are disposed in front of the aperture portion 5a. The amount of light passing through the aperture portion 5a is regulated by controlling the rotational position of the blade member. As illustrated in FIG. 2, the stator 4 is mounted to the plate 5 at the outer magnetic pole portions 4a and 4b such that a shaft portion 1e of the rotor 1 is rotatably fitted into a recess portion 5c of the plate 5, and a shaft portion 1f of the rotor 1 is rotatably fitted into a hole portion 4d of the inner magnetic pole portion of the stator 4.

Reference numerals 6 and 7 represent light-amount regulating blades, respectively. The light-amount regulating blades 6 and 7 are driven upon motion (rotation) of the driving pin 1g of the rotor 1, and variably cover the aperture portion 5a to change the aperture area (for example, change the amount of exposure). A round hole 6a of the light-amount regulating blade 6 rotatably engages with a projection 5d of the plate 5, and an elongate hole 6b slidably engages with the driving pin 1g of the rotor 1. Likewise, a round hole 7a of the light-amount regulating blade 7 rotatably engages with a projection 5e of the plate 5, and an elongate hole 7b slidably engages with the driving pin 1g of the rotor 1. Accordingly, the light-amount regulating blade 6 rotates about an axis of the round hole 6a in interlocking relationship with the motion of the driving pin 1g of the rotor 1, and the light-amount regulating blade 7 rotates about an axis of the round hole 7a.

FIG. 6 is a view illustrating positions of the light-amount regulating blades 6 and 7 at the time when no current is supplied to the coil 2, and the rotor 1 takes the third position (the position illustrated in FIG. 3). In this state, the amount of light passing through the aperture portion 5a of the plate 5 is decreased by a predetermined amount. FIG. 7 is a view illustrating positions of the light-amount regulating blades 6 and 7 at the time when a current is supplied to the coil 2, and the rotor 1 takes the first position (the position illustrated in FIG. 4). In this state, the light-amount regulating blades 6 and 7 are retracted from the aperture portion 5a of the plate 5. FIG. 8 is a view illustrating positions of the light-amount regulating blades 6 and 7 at the time when a current in a direction opposite to that of the above current is supplied to the coil 2, and the rotor 1 takes the second position (the position illustrated in FIG. 5). In this state, the light-amount regulating blades 6 and 7 cover the aperture portion 5a of the plate 5.

The light-amount regulating blades 6 and 7 thus change the amount of light passing through the aperture portion 5a of the plate 5 in accordance with the stop position of the rotor 1. In more detail, the light-amount regulating blades 6 and 7 selectively take the first condition under which they are retracted from the aperture portion 5a, the second condition under which they cover the aperture portion 5a, or the third condition which is an intermediate condition between the first condition and the second condition, such that the aperture area formed by the light-amount regulating blades 6 and 7 can be changed and the amount of light passing through the aperture portion 5a can be regulated.

Reference numeral 8 represents a cover 8 for preventing slip-out of the light-amount regulating blades 6 and 7 in the axial direction. The cover 8 is fixed to the plate 5.

FIG. 3 illustrates the rotational state of the rotor 1 held by cogging torque due to the magnet portion of the rotor 1 and the outer magnetic pole portions 4a and 4b at the time when no current is supplied to the coil 2. Upon supplying current to the coil 2 in the state of FIG. 3, the outer magnetic pole portions 4a and 4b of the stator 4 are magnetized into the S pole, and the inner magnetic pole portion 4c of the stator 4 is magnetized into the N pole. The rotor 1 is hence rotated in a clockwise direction, and brought into a state of FIG. 4 in which the driving pin 1g is pushed against one end of the guide groove 5b. Upon stopping the current supply to the coil 2 under this condition, the rotor 1 is again returned to the state of FIG. 3.

Upon supplying current to the coil 2 in a direction opposite to the above direction in the state of FIG. 3, the outer magnetic pole portions 4a and 4b of the stator 4 are magnetized into the N pole, and the inner magnetic pole portion 4c of the stator 4 is magnetized into the S pole. The rotor 1 is hence rotated in a counterclockwise direction in FIG. 3, and brought into a state of FIG. 5 in which the driving pin 1g is pushed against the other end of the guide groove 5b. Upon stopping the current supply to the coil 2 under this condition, the rotor 1 is again returned to the state of FIG. 3.

When the current supplying condition of the coil 2 is changed in such a manner, the driving pin 1g can be moved between three positions of FIGS. 3 to 5 in a reciprocating way. It should be understood that the first position is the stop position of the rotor 1 as illustrated in FIG. 4, the second position is the stop position of the rotor 1 as illustrated in FIG. 5, and the third position is the stop position of the rotor 1 as illustrated in FIG. 3.

The shaft portions 1e and 1f and the driving pin 1g are formed of plastic magnetic material integrally with the rotor 1, so that cost and assemblage errors can be reduced, as compared with a case they are separately formed. Further, positions of the outer magnetic pole portions 4a and 4b and the driving pin 1g are superimposed on each other with respect to the axial direction of the rotor 1, so that the length L (see FIG. 2) in the axial direction of the above-discussed approximately cylindrical driving apparatus can be reduced.

Further, the outer magnetic pole portions 4a and 4b of the stator 4 are shaped into a tooth-shaped structure extending in a direction parallel to the axial direction of the rotor 1 by forming nicks extending from the tip portion of the outer cylinder. Therefore, the diameter of the stator 4 can be reduced to a minimum size that is the sum of the diameter of the magnet portion, the magnetic gap, and the thickness of the rotor 1 itself. The driving apparatus can hence be made very small in its diameter. Resultantly, there can be achieved a compact driving apparatus in which components disposed on the plate 5 can be made very small in the area.

Furthermore, the rotor 1 is sandwiched between the outer magnetic pole portion facing the outer circumferential surface of the rotor 1 and the inner magnetic pole portion facing the inner circumferential surface of the rotor 1. Accordingly, a magnetic circuit with a small magnetic resistance can be constructed, and upon supplying current to the coil 2, magnetic field lines emerging from one magnetic pole portion can flow into the other magnetic pole portion. Hence, most of generated magnetic field lines act on the rotor 1 sandwiched by those magnetic pole portions. A small-sized driving apparatus with a high rotational output can thus be readily achieved. In addition thereto, one coil 2 is sufficient, and therefore a circuit for controlling the current supply can be simplified and the cost can be reduced.

The angle facing the rotor 1 for each of the outer magnetic pole portions 4a and 4b will be discussed.

In this embodiment, unless current is supplied to the coil 2, the rotational position of the rotor 1 is held at the third position of FIG. 3. This situation will be described with reference to FIGS. 9 and 10.

Figure 9:
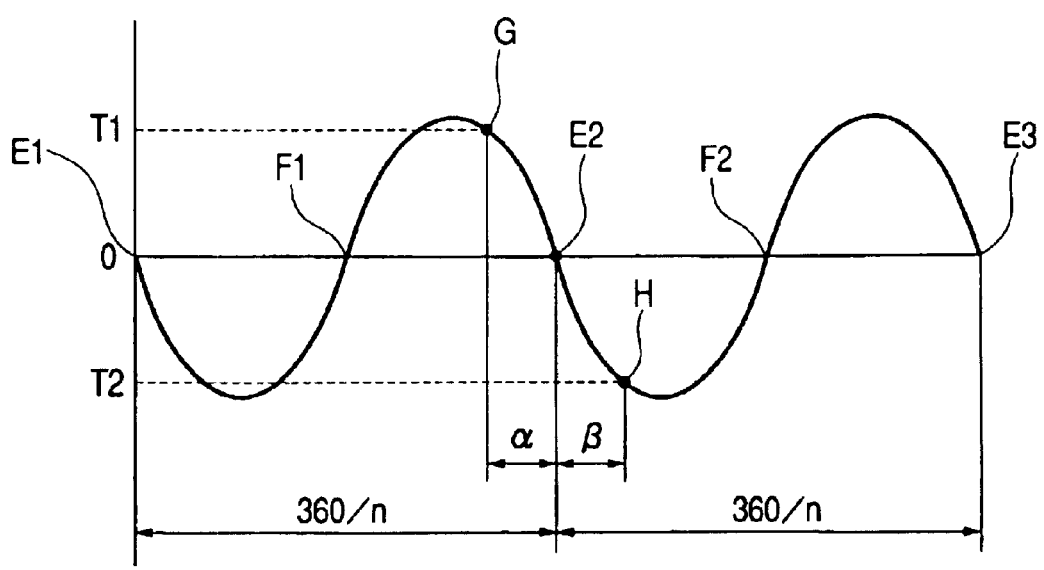
FIG. 9 is a graph showing the cogging torque in the first embodiment.

In FIG. 9, its ordinate represents the magnitude of magnetic force generated between the outer and inner magnetic pole portions and acting on the rotor 1, and its abscissa represents the rotational phase of the rotor 1.

At places indicated by points E1, E2 and E3, if the rotor 1 is about to rotate in a positive direction, force capable of rotating the rotor 1 in its opposite direction acts on the rotor 1, and if the rotor 1 is about to rotate in a negative direction, force capable of rotating the rotor 1 in its opposite direction acts on the rotor 1. The rotor 1 is hence returned to its original position. At point E1, E2 or E3, the rotor 1 is stably positioned due to the magnetic force between the magnet portion and the outer magnetic pole portion. Points F1 and F2 are stop positions under unstable equilibrium conditions under which force capable of rotating the rotor toward the point E1, E2 or E3 in the neighborhood of the point F1 or F2 acts on the rotor if the magnet portion deviates even slightly. Under the condition under which no current is supplied to the coil 2, the rotor 1 never stays at the F1 or F2 due to vibrations and changes in its posture, and stops at the point E1, E2 or E3.

Cogging stable points, such as those indicated by the points E1, E2 and E3, exist with intervals of 360/NA, where the number of magnetized poles in the magnet portion is NA. Intermediate positions between those stable positions are unstable positions such as the points F1 and F2.

From results of the numerical simulation by a finite element method, it becomes apparent that the attractive condition between the outer magnetic pole portion and the magnet portion at the time when no current is supplied to the coil varies according to the relationship between the angle of each magnetized pole in the magnet portion (the central angle of the magnetized portion in the magnet portion), and the opposing angle of the outer magnetic pole portion facing the magnet portion (an angle indicated by A in FIG. 3 which is an arcuate central angle formed by the outer magnetic pole portion 4a and the rotational center position of the magnet portion).

According to the above result, the cogging position of the magnet portion varies according to the angle of the outer magnetic pole portion facing the magnet portion. In other words, when the angle of the outer magnetic pole portion facing the magnet portion is below a predetermined value, the center of the magnetic pole in the magnet portion is stably held at a position at which this center faces the center of the outer magnetic pole portion. The points E1, E2 and E3 in FIG. 9 correspond to this condition. Conversely, when the angle of the outer magnetic pole portion facing the magnet portion exceeds the predetermined value, the boundary between the magnetic poles in the magnet portion is stably held at a position at which this boundary faces the center of the outer magnetic pole portion. The points E1, E2 and E3 in FIG. 9 correspond to this position. This situation will be described with reference to FIG. 10.

Figure 10:
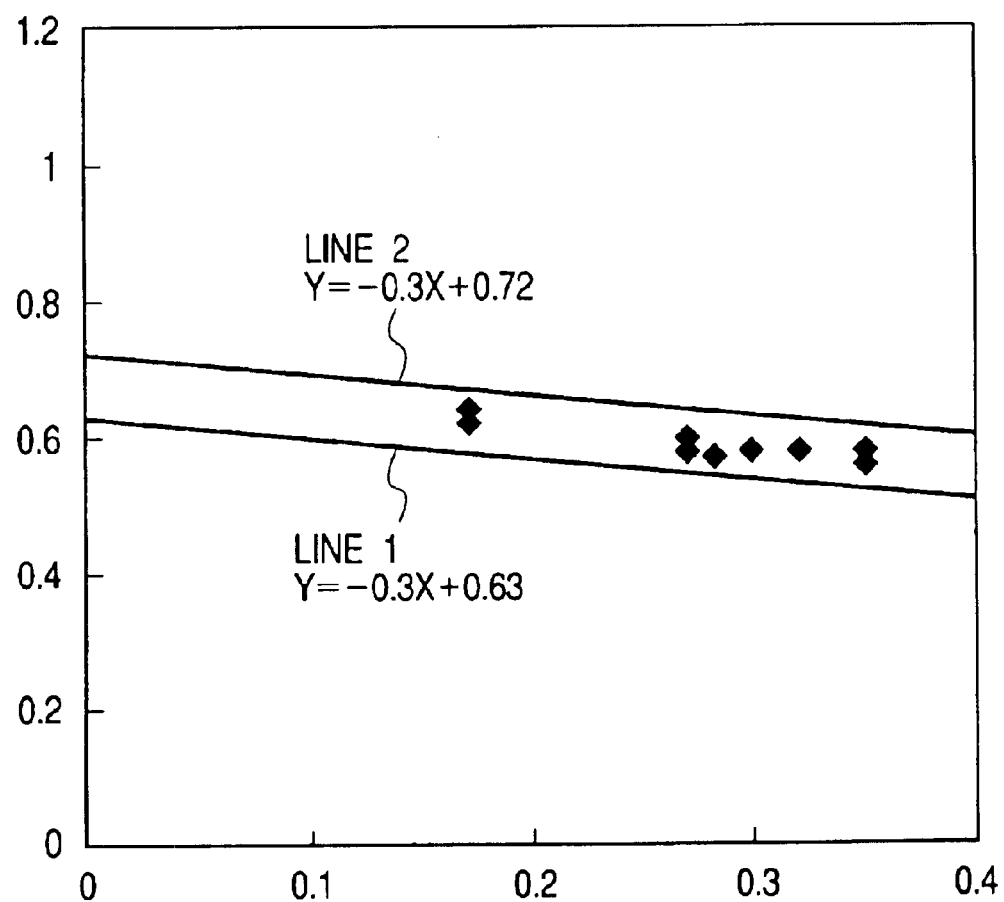
FIG. 10 is a graph showing the relationship between the width size of the outer magnetic pole portion, the cogging torque, and the size of the magnet portion in the first embodiment.

FIG. 10 shows the relationship between the width size of the outer magnetic pole portion, the cogging torque, and the size of the magnet portion.

In FIG. 10, its abscissa represents a ratio of the thickness of the magnet relative to the outer circumferential length of each magnetic pole in the rotor, and its ordinate represents a ratio of the opposing angle of each outer magnetic pole portion facing the magnet relative to the angle of each magnetic pole in the rotor (i.e., a ratio of the central angle of each magnetic pole in the outer magnetic pole portion relative to the central angle of each magnetic pole in the magnet).

For example, when the outer diameter of the magnet is 10 mm, its inner diameter is 9 mm, and the number of magnetic poles in the magnet is sixteen (16), the thickness of the magnet is (10−2)/2 mm, the outer circumferential length of each magnetized magnetic pole in the magnet is $10 \times \pi/16$ mm, and hence the value on the abscissa of the ratio of the thickness of the magnet relative to the outer circumferential length of each magnetic pole in the rotor becomes 0.255. Further, when the opposing angle of each outer magnetic pole portion facing the magnet is 13 degrees, the value on the ordinate of the ratio of the opposing angle of each outer magnetic pole portion facing the magnet relative to the angle of each magnetic pole-in the rotor becomes 0.578 since the angle of each magnetic pole in the rotor is 22.5 degrees.

In FIG. 10, each plotted point indicates "the ratio of the opposing angle of each outer magnetic pole portion facing the magnet relative to the angle of each magnetic pole in the rotor", and "the ratio of the thickness of the magnet relative to the outer circumferential length of each magnetic pole in the rotor" in a motor model in which the cogging torque is approximately zero, or minimum. FIG. 10 shows the graph of nine (9) types of motors described in the table of FIG. 11.

In FIG. 10, where its ordinate Y represents the ratio of the opposing angle of each outer magnetic pole portion facing the magnet relative to the angle of each magnetic pole in the rotor, and its abscissa X represents the ratio of the thickness of the magnet relative to the outer circumferential length of each magnetic pole in the rotor, above points fall within a region surrounded with the line 1 approximately defined by Y=−0.3X+0.63 and the line 2 approximately defined by Y=−0.3X+0.72.

In FIG. 10, in a region below the line 1 (i.e., a region of Y<−0.3X+0.63), the center of the pole in the magnet is stably held at a position at which this center faces the center of the outer magnetic pole portion, and in a region above the line 2 (i.e., a region of Y<−0.3X+0.72), the boundary between the poles in the magnet is stably held at a position at which this boundary faces the center of the outer magnetic pole portion.

In the region surrounded by the line 1 and the line 2 (i.e., where the condition of −0.3X+0.63≦Y≦−0.3X+0.72 is satisfied), the cogging torque is extremely small.

Here, where each opposing angle A of each of the outer magnetic pole portions 4a and 4b gradually changes along the axial direction of the magnet, the average opposing angle only needs to satisfy the above condition. Specifically, for example, when the opposing angle A near the end face of the magnet is fifteen (15) degrees, and the opposing angle A near the tip portion of the outer magnetic pole portion is about thirteen (13) degrees, their averaged value of fourteen (14) degrees is applied to the above condition.

Figure 12:
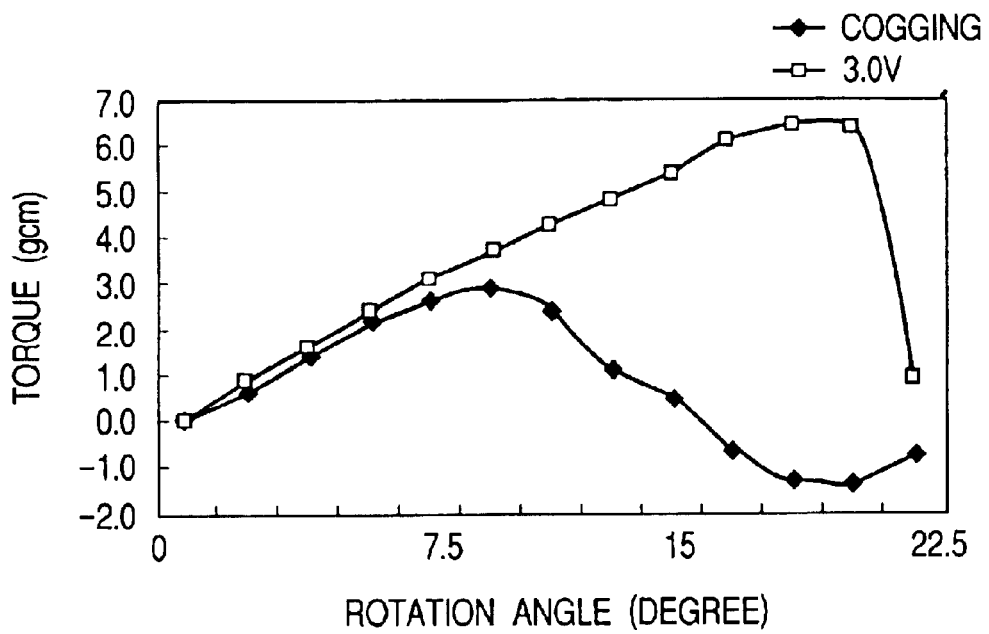
FIG. 12 is a graph showing experimental results of the relationship between the cogging torque and the rotational phase of the rotor in the first embodiment.
Figure 13:
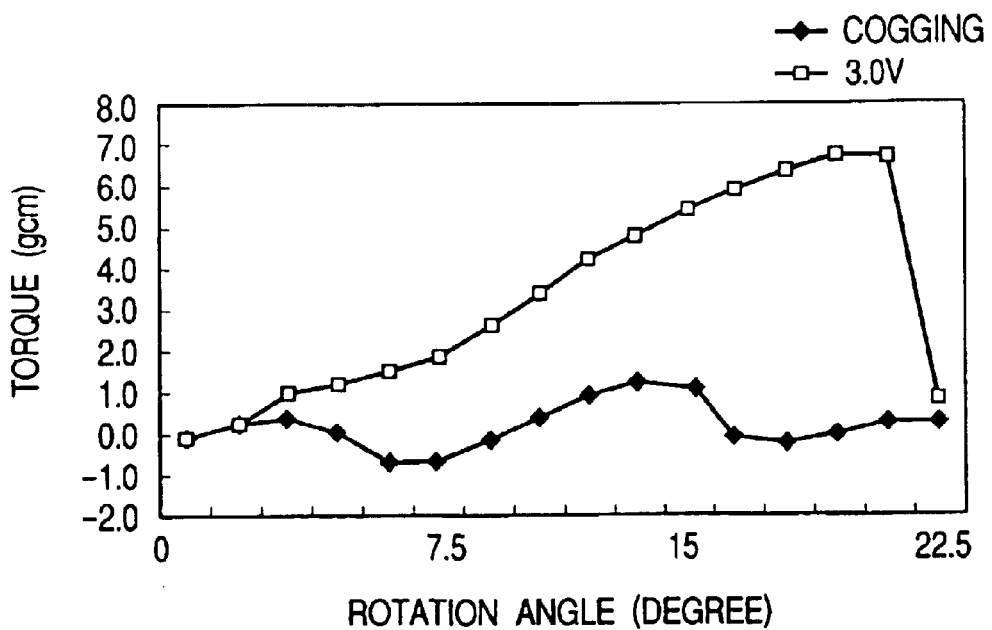
FIG. 13 is a graph showing experimental results of the relationship between the cogging torque and the rotational phase of the rotor in the first embodiment.
Figure 14:
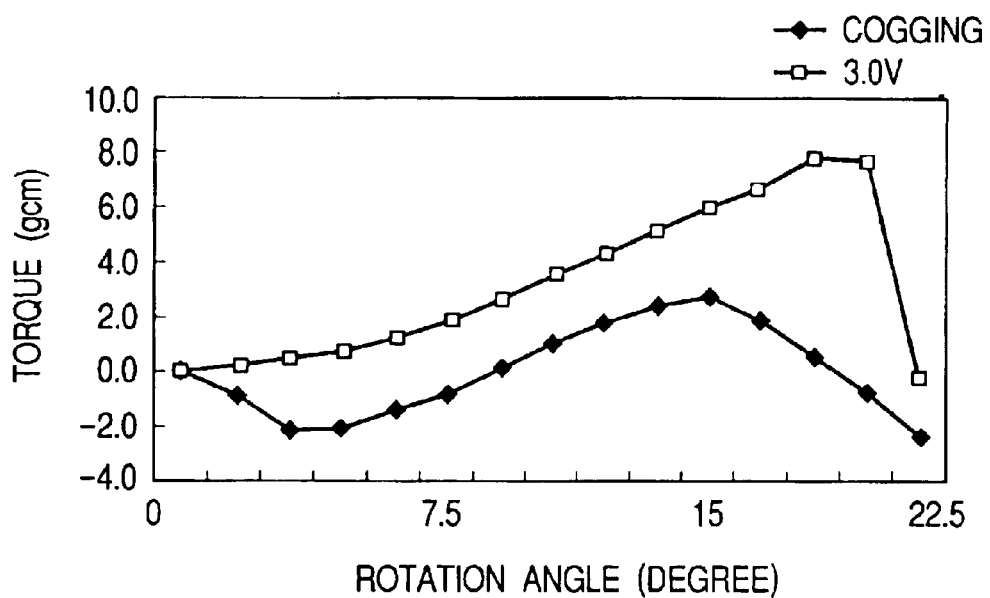
FIG. 14 is a graph showing experimental results of the relationship between the cogging torque and the rotational phase of the rotor in the first embodiment.

Experimental results are shown in FIGS. 12, 13 and 14.

In FIGS. 12, 13 and 14, similar to FIG. 9, the ordinate represents the torque due to the magnetic force generated between the outer and inner magnetic pole portions and acting on the rotor 1, and the abscissa represents the rotational phase of the rotor 1. There are shown the cogging torque at the time when no current is supplied to the coil 2, and current-supply torque generated when a voltage of 3 V is applied across terminals of the coil 2. In the motor model, the outer diameter of the magnet is 10.6 mm, the inner diameter of the magnet is 9.8 mm, the number of magnetized poles in the magnet is 16, the turn number of the coil is 112 turns, the resistance is 10Ω, the outer diameter of the outer magnetic pole portion in the stator is 11.6 mm, the inner diameter of the outer magnetic pole portion in the stator is 11.1 mm, the outer diameter of the inner magnetic pole portion in the stator is 9.3 mm, and the inner diameter of the inner magnetic pole portion in the stator is 8.8 mm. The configuration of the motor is similar to that as illustrated in FIGS. 1 to 4.

In FIG. 12, each opposing angle A of the outer magnetic pole portion facing the magnet is 10.35 degrees, X=0.192, and Y=0.46.

In FIG. 13, each opposing angle A of the outer magnetic pole portion facing the magnet is 13.45 degrees, X=0.192, and Y=0.60. In this case, the torque at the time when no current is supplied, i.e., the cogging torque, is smallest.

In FIG. 14, each opposing angle A of the outer magnetic pole portion facing the magnet is 15.52 degrees, X=0.192, and Y=0.69.

Figure 15:
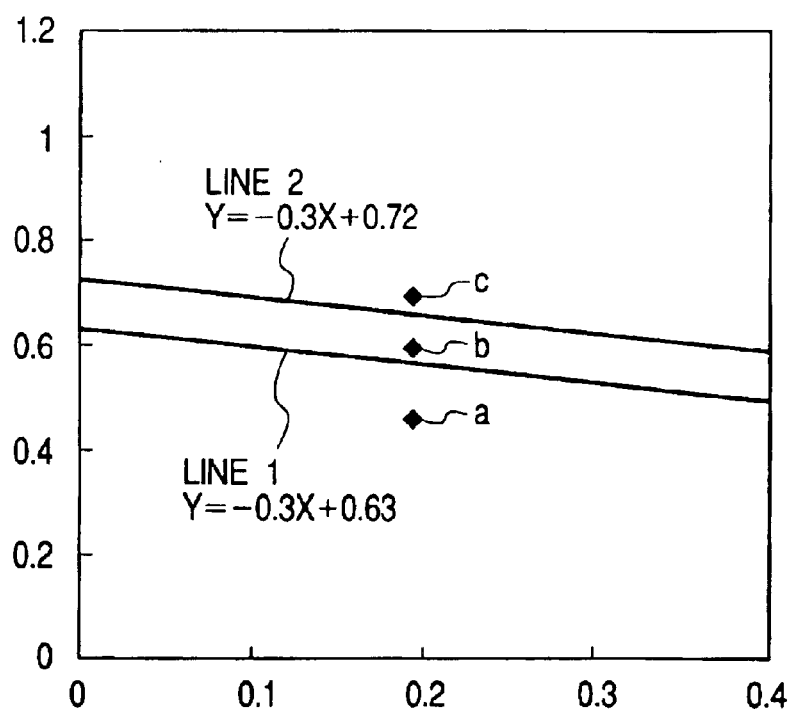
FIG. 15 is a graph showing the relationship between the width size of the outer magnetic pole portion, the cogging torque, and the size of the magnet portion in experimental models of the first embodiment.

In FIG. 15 illustrating the lines 1 and 2 obtained in FIG. 10, structures of FIGS. 12, 13 and 14 are indicated by points a, b and c, respectively.

In the apparatus having structural characteristics shown in FIG. 12 (i.e., the apparatus in which the opposing angle A of the outer magnetic pole portion facing the magnet is 10.35 degrees), X=0.192 and Y=0.46. Therefore, the condition of Y<−0.3X+0.63 is satisfied, and the stable position of the magnet is a position at which the pole center of the magnetized portion faces the center of the outer magnetic pole portion.

In the apparatus having structural characteristics shown in FIG. 13 (i.e., the apparatus in which the opposing angle A of the outer magnetic pole portion facing the magnet is 13.45 degrees), X=0.192 and Y=0.60. The condition of −0.3X+0.63≦Y≦−0.3X+0.72 is hence satisfied, and the cogging torque is extremely small.

In the apparatus having structural characteristics shown in FIG. 14 (i.e., the apparatus in which the opposing angle A of the outer magnetic pole portion facing the magnet is 15.52 degrees), X=0.192 and Y=0.69. The condition of −0.3X+0.72<Y is hence satisfied, and the stable position of the magnet is a position at which the boundary between poles of the magnetized portions faces the center of the outer magnetic pole portion.

In the above-discussed first embodiment, the size of the apparatus is set such that the condition of −0.3X+0.72<Y can be satisfied. Accordingly, when no current is supplied to the coil 2 (the state of FIG. 3), the points E1, E2 and E3 illustrated in FIG. 9 indicate positions at which the boundary Q1 between the poles in the magnet portion of the rotor 1 faces the center R1 of the outer magnetic pole portion 4a or 4b, and stably stays thereat.

Here, the opposing angle A of the outer magnetic pole portion 4a or 4b facing the outer circumferential surface of the magnet portion is desirably set considering size tolerances and fitting rattle of the components. In more detail, in the above case, for example, even if the value of Y of the outer magnetic pole portion 4a or 4b is largely set, the boundary between the poles of the magnet can be stably held at the position at which this boundary faces the center of the outer magnetic pole portion 4a or 4b theoretically. However, considering the component tolerances, there is only a small guarantee of stably holding the boundary between the poles of the magnet at the position at which this boundary faces the center of the outer magnetic pole portion 4a or 4b. Accordingly, the outer magnetic pole portion needs to be set with a little more tolerance. If, however, the opposing angle A of the outer magnetic pole portion is set more than it needs, the cogging torque becomes too large. The rotational torque hence tends to decrease. Therefore, the outer magnetic pole portion needs to be set considering the balancing point between the cogging torque and the necessary torque.

Upon supplying current to the coil 2 in the state of FIG. 3, the center of the pole in the magnet and the central position of the outer magnetic pole portion 4a or 4b are going to face each other, and the hence the rotor 1 rotates. At this moment, if the rotor 1 is rotated until the center of the pole in the magnet and the central position of the outer magnetic pole portion 4a or 4b face each other, the rotor 1 comes to take the position F1 or F2 illustrated in FIG. 9. Therefore, when the current supply to the coil 2 is ceased, equivalent forces in opposite rotational directions act on the magnet. Hence, there is no certainty that the rotor 1 is returned to the state of FIG. 3.

In this embodiment, the relationship between the guide groove 5b of the plate 5 and the driving pin 1g of the rotor 1 is set in the following manner such that the rotor 1 would not be rotated up to the position at which the center of the pole in the rotor 1 faces the center of the outer magnetic pole portion 4a or 4b.

The rotational potion of the rotor 1 illustrated in FIG. 3 is assumed to be the position indicated by the point E2 of FIG. 9. At the time when the driving pin 1g abuts one end face of the guide groove 5b as illustrated in FIG. 4, an angle formed by the boundary portion Q1 between the poles in the magnet portion of the rotor 1 and the center R1 of the outer magnetic pole portion 4a (the same in the case of the outer magnetic pole portion 4b) is set to be β degrees (not zero). The rotational position of the rotor 1 at this moment corresponds to the point H in FIG. 9, and this is a position between the point E2 and the point F2 adjacent thereto. The cogging torque at this position (the attractive force generated between the stator 4 and the magnet portion of the rotor 1 and acting on this magnet portion) is T2, and rotational force for returning the rotor 1 to the point E2 thus acts on the rotor 1.

At the time when the driving pin 1q abuts the other end face of the guide groove 5b as illustrated in FIG. 5, an angle formed by the boundary portion Q1 between the poles in the magnet portion of the rotor 1 and the center R1 of the outer magnetic pole portion 4a (the same in the case of the outer magnetic pole portion 4b) is set to be α degrees (not zero). The rotational position of the rotor 1 at this moment corresponds to the point G in FIG. 9, and this is a position between the point E2 and the point F1 adjacent thereto. The cogging torque at this position is T1, and rotational force for returning the rotor 1 to the point E2 thus acts on the rotor 1.

In other words, the range of the rotational angle of the rotor 1 is set so as to include regions wherein directions of the cogging torque acting on the magnet portion of the rotor 1 are opposite to each other, but not to include the region wherein the boundary portion between the poles in the magnet portion of the rotor 1 faces the center of the outer magnetic pole portion.

In the thus-discussed structure, the rotor 1 is rotated between the first position of FIG. 4 and the second position of FIG. 5 by changing the direction of current supply to the coil 2, and the rotor 1 can be returned to the third position of FIG. 3 from either position (the first or second position) upon ceasing current supply to the coil 2.

The light-amount regulating blades 6 and 7 rotate in interlocking relationship with the rotor 1. As discussed above, when the magnet portion of the rotor 1 is in the first position of FIG. 4, the light-amount regulating blades 6 and 7 are retracted from the aperture portion 5a of the plate 5 as illustrated in FIG. 7. The aperture amount established by the light-amount regulating blades 6 and 7 is maximum at this moment. When the magnet portion of the rotor 1 is in the second position of FIG. 5, the light-amount regulating blades 6 and 7 cover the aperture portion 5a of the plate 5 as illustrated in FIG. 8. The aperture amount established by the light-amount regulating blades 6 and 7 is minimum at this moment. When the magnet portion of the rotor 1 is in the third position of FIG. 3, the light-amount regulating blades 6 and 7 partly cover the aperture portion 5a of the plate 5 as illustrated in FIG. 6. At this moment the aperture amount established by the light-amount regulating blades 6 and 7 is about a half of the amount of FIG. 7.

Accordingly, when current supply to the coil 2 and its direction are changed, the condition of the light-amount regulating blades 6 and 7 relative to the aperture portion 5a can be controlled among open condition, intermediate closed condition and closed condition (conditions illustrated in FIGS. 6 to 8). The amount of light passing through the aperture portion 5a of the plate 5 can thus be regulated. Further, at the time when no current is supplied to the coil 2, the intermediate closed condition is maintained by the attractive force between the magnet portion of the rotor and the outer magnetic pole portions 4a and 4b. In this embodiment, two outer magnetic pole portions are provided, but one outer magnetic pole portion will suffice for the intended purpose.

While the first embodiment relates to the apparatus using the light-amount regulating blade (a stop-diameter blade) as a light-amount regulating member to change the aperture area, the apparatus of the present invention is not limited thereto. For example, the light-amount regulating blade can be replaced by a shutter blade, or a light-amount regulating filter plate which advance or retract an ND (neutral density) filter with plural grades of density toward or from the aperture portion to change the amount of light passing through the aperture portion. Further, in the driving apparatus of the first embodiment, the optical axis and the rotational axis of the driving apparatus are arranged parallel to each other, but they can be arranged in a non-parallel manner. Furthermore, a member to be driven by the driving apparatus can be members other than the stop blade, the shutter blade, etc.

Figure 16:
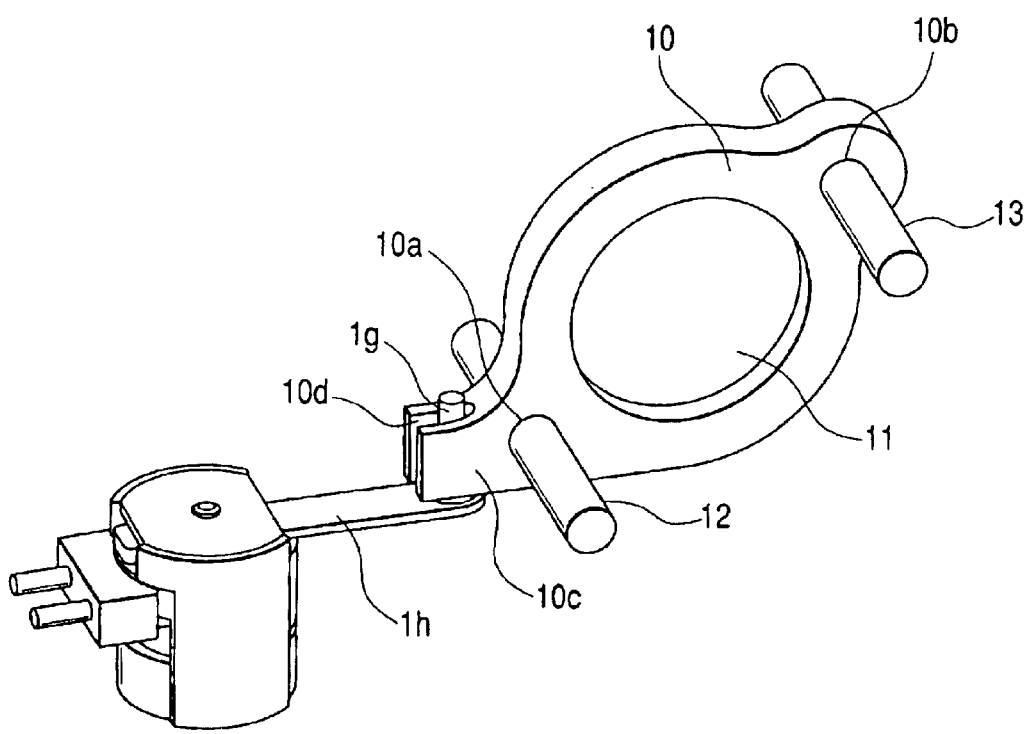
FIG. 16 is a perspective view illustrating a second embodiment of a lens driving apparatus according to the present invention.
Figure 17:
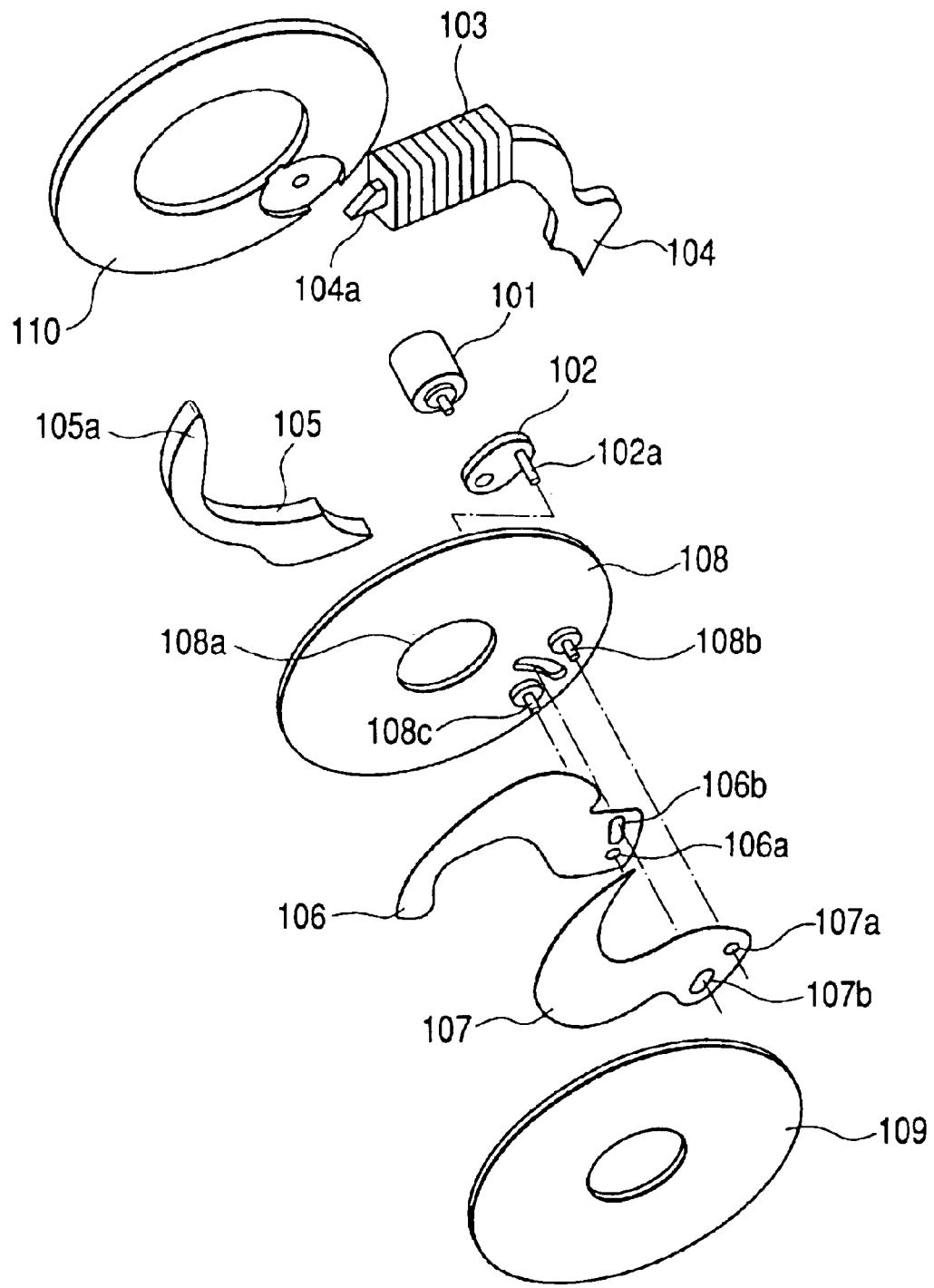
FIG. 17 is a disassembled perspective view illustrating a conventional shutter blade driving apparatus.
Figure 18:
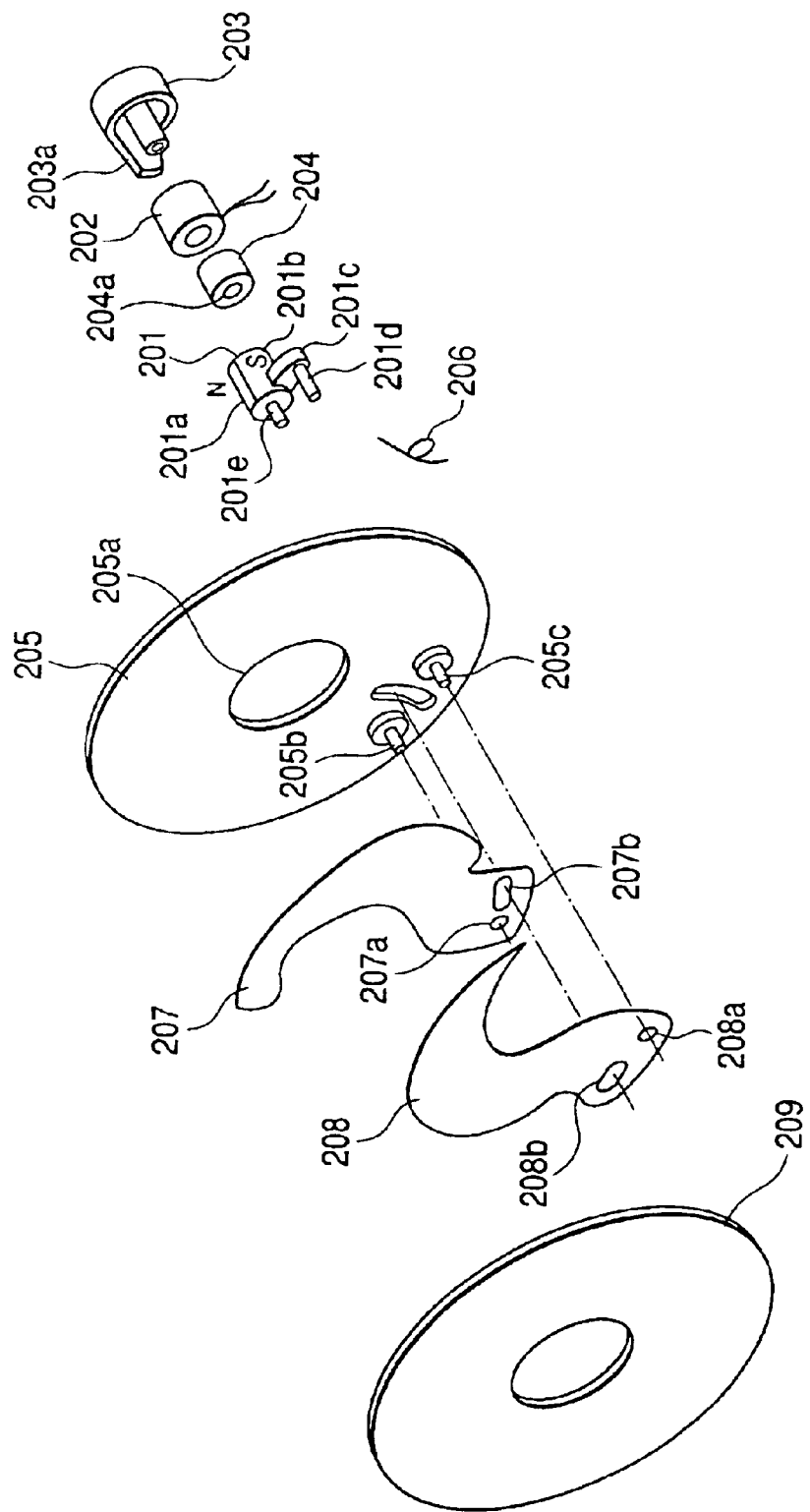
FIG. 18 is a disassembled perspective view illustrating another conventional shutter blade driving apparatus.

FIG. 16 is a disassembled perspective view illustrating a second embodiment of a lens driving apparatus according to the present invention. This apparatus drives the lens in a direction of its optical axis. The driving apparatus including rotor 1, coil 2, bobbin 3, and stator 4 is approximately the same as that of the first embodiment with the exception an arm 1h extending in a radial direction of the rotor is provided and the driving pin 1g is formed on its tip portion.

In FIG. 16, reference numeral 10 denotes a lens holder. Reference numeral 11 denotes a lens fixed to the lens holder 10. Reference numerals 12 and 13 denote shafts provided parallel to the optical axis of the lens 11 to serve as guides when the lens holder 10 moves. The shafts 12 and 13 are arranged perpendicularly to the rotational axis of the rotor in the driving apparatus.

Fit portions 10a and 10b of the lens holder slidably engage with the shafts 12 and 13, and can reciprocate along the shaft, respectively. The holder 10 has an arm portion 10c, and a sliding portion 10d is formed at its tip portion. The driving pin 1g of the rotor 1 is slidably fitted into the sliding portion 10d.

Since the driving apparatus of the second embodiment is the same as that of the first embodiment, the driving pin 1g of the rotor 1 can be selectively stopped at one of three positions when current supply to the coil 2 and its direction are changed. Interlocking therewith, the lens 11 can be selectively held in one of three states. When the apparatus is so constructed such that the lens can be moved in a direction parallel to the optical axis, a lens driving apparatus capable of flexibly selecting one of three focal lengths can be achieved. Further, the apparatus is advantageous in power consumption, since the lens position is maintained by the cogging torque without current supply to the coil at the time when one of the focal lengths is selected.

The driving pin 1g of the rotor and the arm 1h with the driving pin 1g formed thereon can be provided as a separate member moving in interlocking relationship with the magnet portion, without forming integrally with the magnet portion of the rotor.

Further, the driving apparatus can be modified as an apparatus in which the rotational axis is arranged parallel to the optical axis of the lens, and the lens can be moved perpendicularly to the optical axis. When three different kinds of lenses are mounted to the lens holder in a mutually-shifted manner, a lens driving apparatus capable of selecting one of the three lenses according to rotation of the rotor can be obtained.

As described in the foregoing, according to the above embodiments, there can be provided a driving apparatus in which the condition of $-0.3X+0.72<Y$ is satisfied such that the cogging torque can act to cause the boundary portion between the magnetized poles in the magnet portion and the central position of the outer magnetic pole portion to face each other, where Y is the ratio of the central angle of each outer magnetic pole portion relative to the central angle of each magnetized pole in the magnet portion, and X is the ratio of a circumferential length of each magnetized pole in the magnet portion relative to the thickness of the magnet portion in its radial direction.

Therefore, when no current is supplied to the coil, the rotor is held by the cogging torque acting between the magnet portion of the rotor and the stator at the position where the boundary portion between the magnetized poles in the magnet portion faces the central position of the outer magnetic pole portion. Further, the rotor can be rotated in a direction according to the direction of current supplied to the coil. Thus, it is possible to achieve a simple driving apparatus in which the rotor can selectively take one of three stop positions.

What is claimed is:

1. A driving apparatus comprising:
   a rotor rotatable about a rotational axis and having a cylindrical magnet portion whose outer circumferential surface are divided along a circumferential direction into a plurality of differently magnetized portions;
   at least an outer magnetic pole portion formed extending in a direction parallel to said rotational axis of said rotor, and facing said outer circumferential surface of said magnet portion;
   an inner magnetic pole portion formed opposingly to said outer magnetic pole portion, and facing an inner circumferential surface of said magnet portion; and
   a coil for magnetically exciting said outer magnetic pole portion and said inner magnetic pole portion, said coil being arranged along a direction of said rotational axis of said rotor;
   wherein said rotor can be selectively held at one of three stop positions, and a condition of $-0.3X+0.72<Y$ is satisfied where Y is a ratio of a central angle of each outer magnetic pole portion relative to a central angle of each magnetized pole in said magnet portion, and X is a ratio of a circumferential length of each magnetized pole in said magnet portion relative to a thickness of said magnet portion in its radial direction.

2. A driving apparatus according to claim 1, further comprising a regulating member, said regulating member regulating a rotational range of said rotor such that the rotational range includes regions in which directions of attractive force due to magnetic force acting between said magnet portion of said rotor and said outer magnetic pole portion are opposite to each other, but does not include a region in which a center of said magnetized pole in said magnet portion faces a center of said outer magnetic pole portion.

3. A light-amount regulating apparatus comprising:
   a rotor rotatable about a rotational axis and having a cylindrical magnet portion whose outer circumferential surface are divided along a circumferential direction into a plurality of differently magnetized portions;
   an output member, said output member being actuated according to rotation of said rotor;
   at least an outer magnetic pole portion formed extending in a direction parallel to said rotational axis of said rotor, and facing said outer circumferential surface of said magnet portion;
   an inner magnetic pole portion formed opposingly to said outer magnetic pole portion, and facing an inner circumferential surface of said magnet portion;

a coil for magnetically exciting said outer magnetic pole portion and said inner magnetic pole portion, said coil being arranged along a direction of said rotational axis of said rotor;

a plate having an aperture portion; and a light-amount regulating member for changing the amount of light passing through said aperture portion, said light-amount regulating member being driven by said output member to advance toward or retract from said aperture portion of said plate;

wherein said light-amount regulating member can be selectively held at one of three stop positions, and a condition of $-0.3X+0.72<Y$ is satisfied where Y is a ratio of a central angle of each outer magnetic pole portion relative to a central angle of each magnetized pole in said magnet portion, and X is a ratio of a circumferential length of each magnetized pole in said magnet portion relative to a thickness of said magnet portion in its radial direction.

4. A light-amount regulating apparatus according to claim 3, wherein said plate is provided with a guide groove which engages with said output member to restrict an actuation range of said output member, and said guide grove is formed such that the rotational range includes regions in which directions of attractive force due to magnetic force acting between said magnet portion of said rotor and said outer magnetic pole portion are opposite to each other, but does not include a region in which a center of said magnetized pole in said magnet portion faces a center of said outer magnetic pole portion.

5. A light-amount regulating apparatus according to claim 3, wherein said rotor is selectively rotated in one of opposite directions according to a direction of current supplied to said coil with the stop position of said rotor at the time when no current is supplied to said coil being a boundary.

6. A light-amount regulating apparatus according to claim 3, wherein said outer magnetic pole portion is shaped into a tooth-shaped structure extending in a direction parallel to said rotational axis of said rotor by providing nicks extending from a tip portion of a cylinder.

7. A light-amount regulating apparatus according to claim 3, wherein one end of said rotational axis of said rotor rotatably engages with a hole portion formed at a place on said plate away from said aperture portion of said plate, and the other end of said rotational axis of said rotor rotatably engages with a hole portion formed at a central portion of said inner magnetic pole portion.

8. A lens driving apparatus comprising:

a rotor rotatable about a rotational axis and having a cylindrical magnet portion whose outer circumferential surface are divided along a circumferential direction into a plurality of differently magnetized portions;

an output member, said output member being actuated according to rotation of said rotor;

at least an outer magnetic pole portion formed extending in a direction parallel to said rotational axis of said rotor, and facing said outer circumferential surface of said magnet portion;

an inner magnetic pole portion formed oppositely to said outer magnetic pole portion, and facing an inner circumferential surface of said magnet portion;

a coil for magnetically exciting said outer magnetic pole portion and said inner magnetic pole portion, said coil being arranged along a direction of said rotational axis of said rotor;

a plate having an aperture portion; and a lens for changing a focal length of a light beam passing through said aperture portion, said lens being driven by said output member to advance toward or retract from said aperture portion of said plate;

wherein said lens can be selectively held at one of three stop positions, and a condition of $-0.3X+0.72<Y$ is satisfied where Y is a ratio of a central angle of each outer magnetic pole portion relative to a central angle of each magnetized pole in said magnet portion, and X is a ratio of a circumferential length of each magnetized pole in said magnet portion relative to a thickness of said magnet portion in its radial direction.

9. A lens driving apparatus according to claim 8, wherein said plate is provided with a guide groove which engages with said output member to restrict an actuation range of said output member, and said guide grove is formed such that the rotational range includes regions in which directions of attractive force due to magnetic force acting between said magnet portion of said rotor and said outer magnetic pole portion are opposite to each other, but does not include a region in which a center of said magnetized pole in said magnet portion faces a center of said outer magnetic pole portion.

* * * * *

UNITED STATES PATENT AND TRADEMARK OFFICE
CERTIFICATE OF CORRECTION

PATENT NO. : 6,798,987 B2
DATED : September 28, 2004
INVENTOR(S) : Kaori Horiike It is certified that error appears in the above-identified patent and that said Letters Patent is hereby corrected as shown below:

<u>Column 9,</u>
Line 51, delete "pole-" and insert -- pole --.

<u>Column 12,</u>
Line 9, delete "pin 1q" and insert -- pin 1g --.

Signed and Sealed this

Twenty-first Day of March, 2006

JON W. DUDAS
*Director of the United States Patent and Trademark Office*